(12) United States Patent
Morishima

(10) Patent No.: US 8,207,746 B2
(45) Date of Patent: Jun. 26, 2012

(54) CALIBRATION METHOD FOR INERTIAL DRIVE ACTUATOR, AND INERTIAL DRIVE ACTUATOR DEVICE

(75) Inventor: Tetsuya Morishima, Tokyo (JP)

(73) Assignee: Olympus Corporation, Tokyo (JP)

( * ) Notice: Subject to any disclaimer, the term of this patent is extended or adjusted under 35 U.S.C. 154(b) by 284 days.

(21) Appl. No.: 12/724,931

(22) Filed: Mar. 16, 2010

(65) Prior Publication Data

US 2010/0237881 A1 Sep. 23, 2010

(30) Foreign Application Priority Data

Mar. 17, 2009 (JP) .................................. 2009-064046

(51) Int. Cl.
*G01R 27/26* (2006.01)
*G01R 35/00* (2006.01)
*H02N 2/00* (2006.01)
(52) U.S. Cl. ........ 324/622; 324/601; 310/309; 310/317; 310/323.09; 310/329
(58) Field of Classification Search .................. 324/601, 324/662; 310/309, 316.01, 317, 323.01, 310/323.09, 329
See application file for complete search history.

(56) References Cited

U.S. PATENT DOCUMENTS

| | | | |
|---|---|---|---|
| 6,577,975 B2 * | 6/2003 | Chiesa | 702/94 |
| 2008/0278840 A1 * | 11/2008 | Matsuki | 360/71 |
| 2009/0015949 A1 * | 1/2009 | Matsuki | 359/824 |

FOREIGN PATENT DOCUMENTS

JP 2003-185406 7/2003

* cited by examiner

*Primary Examiner* — Timothy J Dole
(74) *Attorney, Agent, or Firm* — Scully, Scott, Murphy & Presser, P.C.

(57) ABSTRACT

A calibration method for inertial drive actuator of driving a target moving body among a plurality of moving bodies to move by inertia between a first movement limit position and a second movement limit position in relation to an oscillating plate that is moved to reciprocate by a moving member, and detecting positions of the moving bodies based on electrostatic capacitances includes detecting electrostatic capacitances of opposing parts of a moving body side electrode provided in a target moving body and an oscillating plate electrode provided in the oscillating plate is detected at the first movement limit position and the second movement limit position, respectively; and calculating a ratio of a difference between the electrostatic capacitances at the first movement limit position and the second movement limit position to a movement limit distance that is a distance between the first movement limit position and the second movement limit position. At least one of the first movement limit position and the second movement limit position is a position where the target moving body abuts against a non-target moving body.

17 Claims, 21 Drawing Sheets

FIG. 5A  DRIVING VOLTAGE 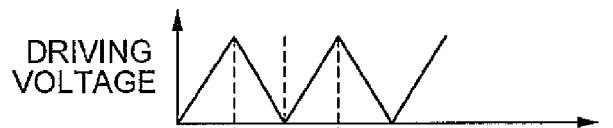
FIG. 5B  DRIVING VOLTAGE 
FIG. 5C  DRIVING VOLTAGE 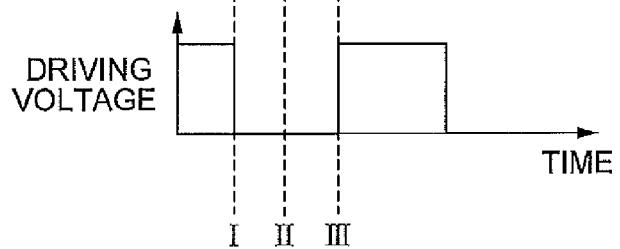

CALIBRATION METHOD FOR INERTIAL DRIVE ACTUATOR, AND INERTIAL DRIVE ACTUATOR DEVICE

CROSS-REFERENCE TO RELATED APPLICATIONS

The present application is based upon and claims the benefit of priority from the prior Japanese Patent Application No. 2009-064046 filed on Mar. 17, 2009; the entire contents of which are incorporated herein by reference.

BACKGROUND OF THE INVENTION

1. Field of the Invention

The present invention relates to a calibration method for inertial drive actuator and an inertial drive actuator device.

2. Description of the Related Art

FIG. 20 is a side-view depicting the structure of a conventional actuator 920. As shown in FIG. 20, the actuator 920 includes a piezoelectric element 911, which is a type of electromechanical converting element, a drive shaft 912, a moving body 913 that is friction-coupled to the drive shaft 912, and a frame 914 of the actuator 920. One end of the piezoelectric element 911 is fixed to the frame 914 while the other end of the piezoelectric element 911 is fixed to the drive shaft 912. A detecting member 921 that is fixed to the frame 914 constitutes a fixed electrode for detecting a position of the moving body 913 based on an electrostatic capacitance. The detecting member 921 is disposed parallel to a direction of movement of the moving body 913 in a contactless manner. The drive shaft 912, the moving body 913, and the detecting member (fixed electrode) 921 are made of a conductive material. The surface of the detecting member 921 that opposes the moving body 913 constitutes an electrode 921. The electrode 921 and the moving body 913 are arranged with a gap D therebetween and they constitute a capacitor having an electrostatic capacitance C.

FIG. 21 is a plan-view depicting the structure of the detecting member 921 and the relationship between the detecting member 921 and the moving body 913. As shown in FIG. 21, the detecting member 921 includes a first electrode 921a and a second electrode 921b arranged on an insulation member 921p. Each of the first electrode 921a and the second electrode 921b has a shape of a right-angled triangle. The first electrode 921a and the second electrode 921b are arranged in such a way that their oblique sides are adjacent to each other. A driving pulse output from a driving circuit 918 (see FIG. 20) is applied to the piezoelectric element 911 and also to the moving body 913 via the drive shaft 912.

As in an exemplary state shown in FIG. 21, the moving body 913 and the first electrode 921a face each other and are coupled by electrostatic-capacitive coupling. Similarly, the moving body 913 and the second electrode 921b face each other and they are coupled by an electrostatic-capacitive coupling. As a result, the driving pulse applied to the moving body 913 flows toward the first electrode 921a and the second electrode 921b. A current i flowing toward the first electrode 921a and the second electrode 921b is detected by a detecting circuit 919 the value of the current i is input into a control circuit 917.

As an example, a case is explained here in which the moving body 913 moves in the direction of an arrow a (see FIG. 21) from the first electrode 921a toward the second electrode 921b. Because of the movement of the moving body 913, while on one hand an opposing electrode surface area between the moving body 913 and the first electrode 921a decreases gradually leading to a gradual decrease in an electrostatic capacitance Ca between the two, on the other hand an opposing electrode surface area between the moving body 913 and the second electrode 921b increases gradually leading to a gradual increase in an electrostatic capacitance Cb between the two. Consequently, as the moving body 913 moves, a current is flowing from the moving body 913 to the first electrode 921a decreases gradually, and a current ib flowing from the moving body 913 to the second electrode 921b increases gradually.

On the other hand, when the moving body 913 moves in the opposite direction of the arrow a, from the second electrode 921b toward the first electrode 921a, while on one hand the opposing electrode surface area between the moving body 913 and the first electrode 921a increases gradually leading to a gradual increase in the electrostatic capacitance Ca between the two, on the other hand the opposing electrode surface area between the moving body 913 and the second electrode 921b decreases gradually leading to a gradual decrease in the electrostatic capacitance Cb between the two. Consequently, as the moving body 913 moves, the current ia flowing from the moving body 913 to the first electrode 921a increases gradually, and the current ib flowing from the moving body 913 to the second electrode 921b decreases gradually.

Thus, the position of the moving body 913 in relation to the detecting member 921 can be determined by comparing the amounts of the currents ia and ib that increase and decrease with the movement of the moving body 913. In addition, the direction of movement of the moving body 913 can be determined based on whether the currents ia and ib increase or decrease.

Such an actuator is disclosed, for example, in Japanese Patent Application Laid-open No. 2003-185406.

However, due to factors such as humidity, temperature (minute deformation of an electrode), gravitation, and aging, the detected value of the electrostatic capacitance sometimes varies from the value detected at the time of assembly of an actuator. Due to this, a relationship between the electrostatic capacitance at the time of assembly and position data is likely to break, thereby causing deterioration of accuracy in position detection.

Thus, a calibration needs to be performed to eliminate deterioration of accuracy in position detection. When a plurality of moving bodies exists, the respective moving body cannot be individually controlled in the conventional technology, thus resulting in incorrect calibration.

SUMMARY OF THE INVENTION

The present invention has been made in view of the above discussion. It is an object of the present invention to provide an inertial-drive actuator calibration method and an inertial drive actuator device that can perform accurate calibration when there are a plurality of moving bodies.

The present invention has another object to provide a technique for correcting, even if electrostatic capacitance between moving bodies and an electrode differs at a later stage after the assembly of the actuator, the electrostatic capacitances to appropriate values to allow absolute positions of plural moving bodies to be reliably and accurately calculated.

To solve the above problems and to achieve the above object, according to an aspect of the present invention, a calibration method for inertial drive actuator of driving a target moving body among a plurality of moving bodies to move by inertia between a first movement limit position and a second movement limit position in relation to an oscillating plate that is moved to reciprocate by a moving member, and detecting positions of the moving bodies based on electrostatic capacitances includes steps of detecting in which, electrostatic capacitances of opposing parts of a moving body side electrode provided in a target moving body and an oscillating plate electrode provided in the oscillating plate is detected at the first movement limit position and the second movement limit position, respectively; storing in which, the electrostatic capacitances at the first movement limit position and the second movement limit position detected at the detecting step are stored; and calculating in which, a ratio of a difference between the electrostatic capacitances at the first movement limit position and the second movement limit position stored at the storing step to a movement limit distance that is a distance between the first movement limit position and the second movement limit position is calculated, wherein it is made possible to calculate an absolute position of the target moving body between the first movement limit position and the second movement limit position by using the ratio calculated at the calculating step, and at least one of the first movement limit position and the second movement limit position is a position where the target moving body abuts against a non-target moving body.

In the calibration method for inertial drive actuator according to another aspect of the present invention, it is preferable that positions of the target moving bodies in a movement range from the first movement limit position to the second movement limit position, and the electrostatic capacitances have a proportional relationship.

The calibration method for inertial drive actuator according to another aspect of the present invention includes a step of comparing in which, the electrostatic capacitances stored at the storing step are compared.

In the calibration method for inertial drive actuator according to another aspect of the present invention, it is preferable that there are a plurality of target moving bodies and a calibration thereof is mutually and simultaneously performed.

It is preferable that the calibration method for inertial drive actuator according to another aspect of the present invention includes a step of locking in which, the non-target moving body is locked to the oscillating plate.

In the calibration method for inertial drive actuator according to another aspect of the present invention, it is preferable that a movement amount per driving waveform is simultaneously calculated for each of the moving bodies.

In the calibration method for inertial drive actuator according to another aspect of the present invention, it is preferable that a movement amount per driving waveform is individually calculated for each of the moving bodies.

In the calibration method for inertial drive actuator according to another aspect of the present invention, it is preferable that recalibration is induced when the electrostatic capacitance varies and an error is detected in a relationship between position data and the electrostatic capacitance even if the moving body is idle in absence of an input signal.

In the calibration method for inertial drive actuator according to another aspect of the present invention, it is preferable that a movement amount per driving waveform when the target moving body is moved from the first movement limit position toward the second movement limit position and a movement amount per driving waveform when the target moving body is moved from the second movement limit position toward the first movement limit position is measured or calculated, and one of the movement amount per driving waveforms is stored or both the movement amount per driving waveforms are stored separately.

In the calibration method for inertial drive actuator according to another aspect of the present invention, it is preferable that when calculating the movement amount per driving waveform, the target moving body is moved at least once near a center in a movement range from the first movement limit position to the second movement limit position.

In the calibration method for inertial drive actuator according to another aspect of the present invention, it is preferable that the oscillating plate electrode is provided in a plurality, and the position of the target moving body is calculated by comparing or calculating electrostatic capacitances between the moving body side electrode and the respective oscillating plate electrodes.

In the calibration method for inertial drive actuator according to another aspect of the present invention, it is preferable that the oscillating plate electrode includes any one of a driving electrode and a position detecting electrode or both.

It is preferable that the calibration method for inertial drive actuator according to another aspect of the present invention further includes a step of confirming in which, a calibration result is confirmed.

In the calibration method for inertial drive actuator according to another aspect of the present invention, it is preferable that recalibration is performed if it is confirmed at the confirming step that calibration is not performed correctly.

An inertial drive actuator device according to another aspect of the present invention includes an oscillating plate that is moved to reciprocate by a moving member; a driving circuit that applies a drive signal to the moving member; a plurality of moving bodies that move by inertia in relation to the oscillating plate, wherein a target moving body among the moving bodies moves by inertia between a first movement limit position and a second movement limit position, and at least one of the first movement limit position and the second movement limit position is a position where the target moving body abuts against a non-target moving body; an electrostatic capacitance detecting circuit that detects an electrostatic capacitance of opposing parts of a moving body electrode provided in the moving bodies and an oscillating plate electrode provided in the oscillating plate; an electrostatic capacitance storage unit that stores therein the electrostatic capacitance detected by the electrostatic capacitance detecting circuit; a ratio calculating unit that calculates a ratio of the electrostatic capacitance stored in the electrostatic capacitance storage unit to the movement limit distance; a ratio storage unit that stores therein the ratio calculated by the ratio calculating unit; a current-position calculating unit that calculates current positions of the moving bodies based on the electrostatic capacitances detected by the electrostatic capacitance detecting circuit and the ratio stored in the ratio storage unit; and a drive-signal calculating unit that calculates drive signals with respect to the moving bodies based on differences between the current positions calculated by the current-position calculating unit and target positions.

In the inertial drive actuator device according to another aspect of the present invention, it is preferable that the moving bodies include a conductive material.

In the inertial drive actuator device according to another aspect of the present invention, it is preferable that a permanent magnet is disposed on a side of the oscillating plate facing the moving bodies, and the moving bodies include a magnetic material.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A depicts a graph of a driving waveform by which the moving body is caused to move to the left in FIG. 1, and a driving voltage applied to the piezoelectric element;

FIG. 5B depicts a graph of the driving waveform by which the moving body is caused to move to the left in FIG. 1, and a driving voltage applied to the oscillating plate electrode;

FIG. 5C depicts a graph of the driving waveform by which the moving body is caused to move to the left in FIG. 1, and a driving voltage applied to the moving body side electrode;

DETAILED DESCRIPTION OF THE PREFERRED EMBODIMENTS

Exemplary embodiments of an inertial drive actuator and an inertial drive actuator device according to the present invention are explained below with reference to the accompanying drawings. However, the invention is not limited to the embodiments explained below.

(First Embodiment)

Figure 1:
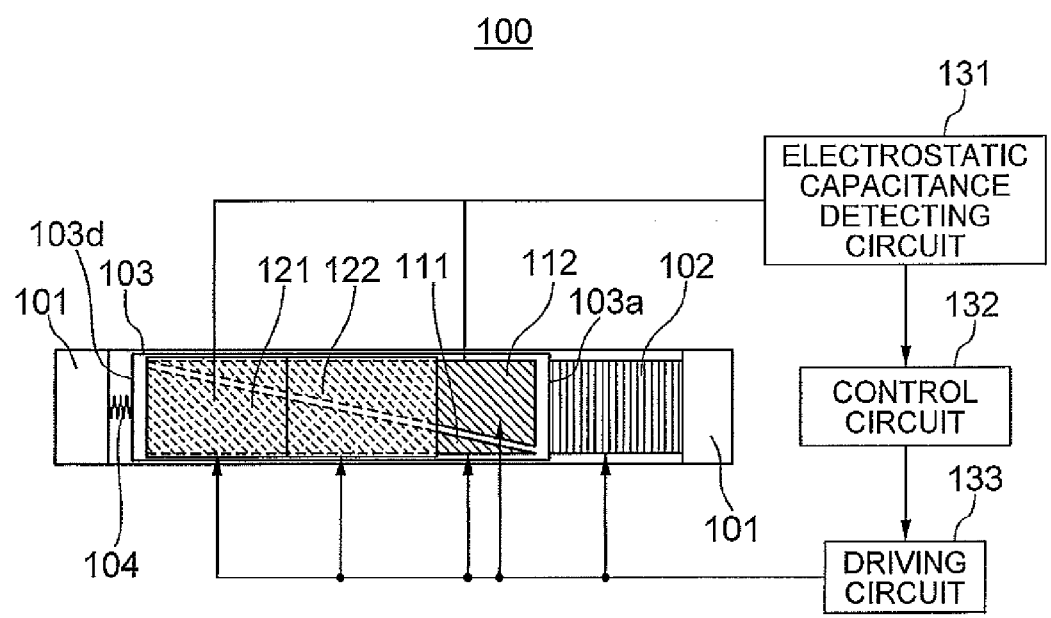
FIG. 1 is a plan-view depicting the structure of an inertial drive actuator device that includes an inertial drive actuator according to a first embodiment.
Figure 2:
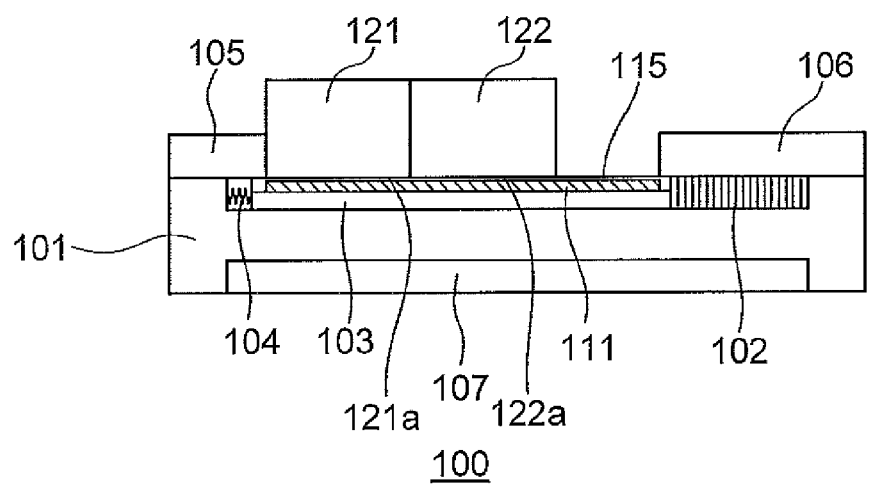
FIG. 2 is a side-view depicting the structure of the inertial drive actuator according to the first embodiment.

The structure of an inertial drive actuator 100 according to a first embodiment is explained with reference to FIGS. 1 and 2. FIG. 1 is a plan-view depicting the structure of an inertial drive actuator device that includes the inertial drive actuator 100 according to the first embodiment. FIG. 2 is a side-view depicting the structure of the inertial drive actuator 100. Attention is drawn to the fact that projecting sections 105 and 106 are not shown in FIG. 1. In the following explanation, the inertial drive actuator device includes the inertial drive actuator 100, an electrostatic capacitance detecting circuit 131 and a driving circuit 133 that are connected to the inertial drive actuator 100, and a control circuit 132.

The inertial drive actuator 100 includes a fixed member 101, a piezoelectric element 102, an oscillating plate 103 displaceably mounted on the fixed member 101, a spring 104, the projecting sections 105 and 106 formed on the fixed member 101, oscillating plate electrodes 111 and 112 disposed on the oscillating plate 103, and moving bodies 121 and 122. A permanent magnet 107 is disposed below the fixed member 101.

One end of the piezoelectric element 102 is disposed adjacent to an inner surface 101a of the fixed member 101. The other end of the piezoelectric element 102 is disposed adjacent to a right hand side surface 103a of the oscillating plate 103.

The spring 104 is disposed so as to face the piezoelectric element 102 via the oscillating plate 103. In other words, one end of the spring 104 is disposed adjacent to an inner surface 101d of the fixed member 101 while the other end is disposed adjacent to a left hand side surface 103d of the oscillating plate 103.

In the inertial drive actuator 100, when the piezoelectric element 102 expands and because of which the oscillating plate 103 is displaced, the spring 104 supports the oscillating plate 103. On the contrary, when the piezoelectric element 102 contracts, the elastic force of the spring 104 causes the oscillating plate 103 to revert to its original position. In other words, the spring 104 assists to convey the expansion and contraction of the piezoelectric element 102 to the oscillating plate 103. A structure is allowable in which both ends of the piezoelectric element 102 and both ends of the spring 104 are fixed to any one of the fixed member 101 and the oscillating plate 103 or both.

The oscillating plate electrodes 111 and 112 are formed on the upper surface of the oscillating plate 103. Moreover, an insulation layer 115 is formed on the upper surface of the oscillating plate electrodes 111 and 112 (see FIG. 2).

The oscillating plate electrodes 111 and 112 are formed in a planar shape of right-angled triangles and they are disposed in such a way that the oblique sides thereof are adjacent to each other. In other words, a width of the oscillating plate electrode 111 narrows as one goes from the spring 104 toward the piezoelectric element 102 in a longitudinal direction (right and left directions in FIGS. 1 and 2) of the oscillating plate 103 and a width of the oscillating plate electrode 112 narrows as one goes from the piezoelectric element 102 toward the spring 104 in the longitudinal direction of the oscillating plate 103.

The oscillating plate electrodes 111 and 112 should preferably be configured in such a way that, due to their planar shape, the electrostatic capacitances between the oscillating plate electrodes 111 and 112, and a moving body side electrode 121a of the moving body 121 vary proportionally with a movement amount as the moving body 121 moves from one movement limiting position to the other movement limiting position.

Two moving bodies 121 are mounted on the oscillating plate electrodes 111 and 112, with the insulation layer 115 disposed therebetween. A moving body side electrode 121a is formed on the lower surface of the moving body 121, that is, on the surface that is in contact with the oscillating plate electrodes 111 and 112, and a moving body side electrode 122a is formed on the lower surface of the moving body 122, that is, on the surface that is in contact with the oscillating plate electrodes 111 and 112.

With the displacement of the oscillating plate 103, the moving bodies 121 and 122 are capable of moving slidingly in relation to the insulation layer 115 in a longitudinal direction of the oscillating plate 103 having a rectangular shape. The moving bodies 121 and 122 should preferably be made of a magnetic material or a conductive material.

The driving circuit 133 is connected to each of the piezoelectric element 102, the oscillating plate electrodes 111 and 112, and the moving body side electrodes 121a and 122a of the moving bodies 121 and 122. The driving circuit 133 applies a driving voltage to drive each of the piezoelectric element 102, the oscillating plate electrodes 111 and 112, and the moving body side electrodes 121a and 122b. Furthermore, the electrostatic capacitance detecting circuit 131 is connected to each of the oscillating plate electrodes 111 and 112. The electrostatic capacitance detecting circuit 131 detects electrostatic capacitances between the moving body side electrodes 121a and 122a of the moving bodies 121 and 122 and each of the oscillating plate electrodes 111 and 112. Signals output from the electrostatic capacitance detecting circuit 131 are input into the control circuit 132.

Figure 3:
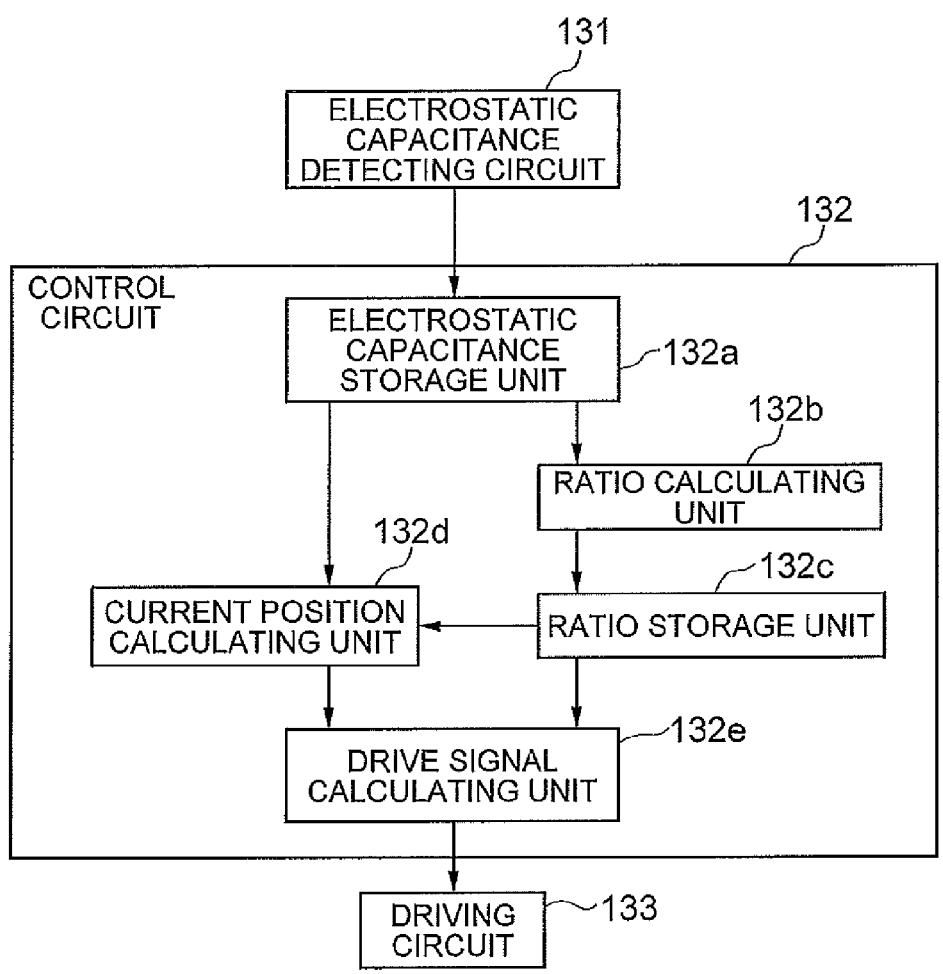
FIG. 3 is a block diagram of a control circuit according to the first embodiment.

An outline of the processes performed by the control circuit 132 is explained with reference to FIG. 3. FIG. 3 is a block diagram depicting the detailed structure of the control circuit 132. The control circuit 132 includes an electrostatic capacitance storage unit 132a, a ratio calculating unit 132b, a ratio storage unit 132c, a current position calculating unit 132d, and a drive signal calculating unit 132e.

To begin with, the electrostatic capacitances input as detection results from the electrostatic capacitance detecting circuit 131 into the control circuit 132 are stored into the electrostatic capacitance storage unit 132a. That is, the electrostatic capacitances between the moving body side electrodes 121a and 122a of the moving bodies 121 and 122 and the oscillating plate electrode 111, and the electrostatic capacitances between the moving body side electrodes 121a and 122a and the oscillating plate electrode 112 are stored in the electrostatic capacitance storage unit 132a. The ratio calculating unit 132b calculates a ratio of movement distances and the electrostatic capacitances of the moving bodies 121 and 122 based on these detected electrostatic capacitances. The calculation result is stored in the ratio storage unit 132c.

The calculation result obtained at the ratio calculating unit 132b is output to the current position calculating unit 132d. The current position calculating unit 132d calculates an absolute position (current position) of each of the moving bodies 121 and 122 on the oscillating plate 103. Subsequently, the drive signal calculating unit 132e generates drive signals for driving the oscillating plate electrodes 111 and 112, and the piezoelectric element 102 based on the calculation result obtained by the ratio calculating unit 132b and a calculation result obtained by the current position calculating unit 132d.

The generated drive signals are output to the driving circuit 133. The driving circuit 133 drives each of the oscillating plate electrodes 111 and 112, the moving body side electrodes 121a and 122b, and the piezoelectric element 102 based on the drive signals input from the control circuit.

The projecting section 105 is formed on the upper surface at the end of the fixed member 101 on the side of the spring 104. The projecting section 105 is formed in such a way that it covers from above the spring 104 and the end of the insulation layer 115 on the side of the spring 104. On the other hand, the projecting section 106 is formed on the upper surface at the end of the fixed member 101 on the side of the piezoelectric element 102. The projecting section 106 is formed in such a way that it covers from above the piezoelectric element 102 and the end of the insulation layer 115 on the side of the piezoelectric element 102.

The projecting sections 105 and 106 limit or regulate the range of movement of each of the moving bodies 121 and 122.

In other words, a position where the moving body 121 abuts against the projection section 105 on the spring 104 side marks a first movement limit position of the moving body 121 and a position where the moving body 121 abuts against the moving body 122 on the piezoelectric element 102 side marks a second movement limit position of the moving body 121. On the other hand, a position where the moving body 122 abuts against the moving body 121 on the spring 104 side marks a first movement limit position of the moving body 122 and a position where the moving body 122 abuts against the projection section 106 on the piezoelectric element 102 side marks a second movement limit position of the moving body 122.

The maximum distance (movement limit distance) that the moving body 121 can move is to the position where the moving body 122 abuts against the projection section 106. On the other hand, the maximum distance (movement limit distance) that the moving body 122 can move is to the position where the moving body 121 abuts against the projection section 105.

Principles of Position Detection

A detection method for detecting the positions of each of the moving bodies 121 and 122 is explained next. The positions of the moving bodies 121 and 122 are detected by using the same components that are used for driving the inertial drive actuator 100. That is, the positions of the moving bodies 121 and 122 are detected by using the moving body side electrodes 121a and 122a provided on the moving bodies 121 and 122 and the oscillating plate electrodes 111 and 112 provided on the oscillating plate 103. Opposing portions of the moving body side electrodes 121a and 122a and the oscillating plate electrodes 111 and 112 can be considered as capacitors.

The positions of the moving bodies 121 and 122 relative to the oscillating plate 103 can be detected by comparing, or detecting, the difference between the electrostatic capacitances equivalent to opposing surface areas between the moving body side electrodes 121a and 122a and the oscillating plate electrode 111, and comparing, or detecting, the difference between the electrostatic capacitances equivalent to opposing surface areas between the moving body side electrodes 121a and 122a and the oscillating plate electrode 112.

For example, when the moving bodies 121 and 122 are moved toward the right on the paper surface in FIG. 1 or 2, the opposing surface areas between the moving body side electrodes 121a and 122a and the oscillating plate electrode 112 increase, and hence the electrostatic capacitances between the oscillating plate electrode 112 and the moving body side electrodes 121a and 122a increase. On the other hand, the opposing surface areas between the moving body side electrodes 121a and 122a and the oscillating plate electrode 111 decrease, and hence the electrostatic capacitances between the oscillating plate electrode 111 and the moving body side electrodes 121a and 122a decrease. By determining the difference between the corresponding electrostatic capacitances, the positions of the moving bodies 121 and 122 can be determined with a high degree of precision based on a magnitude relationship of the electrostatic capacitances.

Any one of the projection sections 105 and 106, and the contacting moving body can be set as the first movement limit position. The positions of the moving bodies and the electrostatic capacitance need not have a proportional relationship as long as the electrostatic capacitance varies as the positions of the moving body shifts.

In the above-described structure, when a driving voltage is applied to each of the oscillating plate electrodes 111 and 112, and the piezoelectric element 102, the oscillating plate 103 is displaced in a direction of displacement of the piezoelectric element 102. The displacement of the oscillating plate 103 enables the moving bodies 121 and 122 disposed on the oscillating plate 103 to move by inertia within a movement range between the first movement limit position and the second movement limit position defined, respectively, by the projection sections 105 and 106.

The movement and locking of the moving body 121 is explained with reference to FIGS. 4A to 4C, 5A to 5C, and 6A to 6C. Only the moving body 121 is explained below. However, the same explanation is applicable to the moving body 122.

Figure 4A:
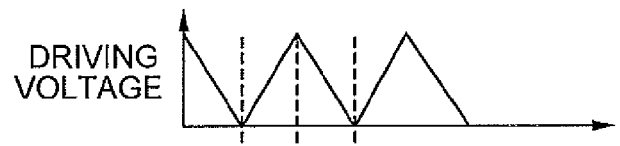
FIG. 4A depicts a graph of a driving waveform by which a moving body is caused to move to the right in FIG. 1, and a driving voltage applied to a piezoelectric element.
Figure 4B:
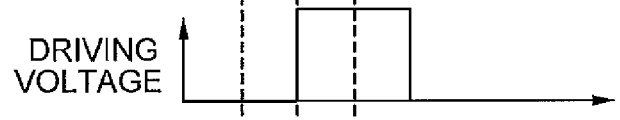
FIG. 4B depicts a graph of a driving waveform by which the moving body is caused to move to the right in FIG. 1, and a driving voltage applied to an oscillating plate electrode.
Figure 4C:
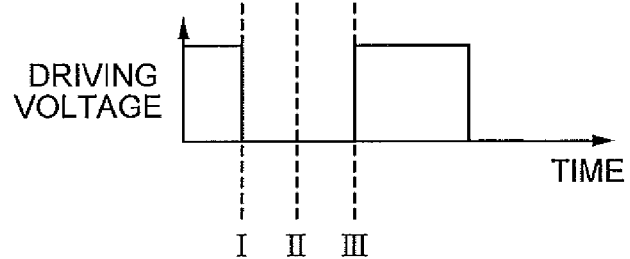
FIG. 4C depicts a graph of a driving waveform by which the moving body is caused to move to the right in FIG. 1, and a driving voltage applied to a moving body side electrode.

FIGS. 4A to 4C depict graphs of a driving waveform by which the moving body 121 is caused to move to the right in FIG. 1, and a driving voltage applied to each of the piezoelectric element 102 in FIG. 4A, the oscillating plate electrodes 111 and 112 in FIG. 4B, and the moving body side electrode 121a in FIG. 4C.

When a steep rising driving voltage (see FIG. 4A) is applied to the piezoelectric element 102 by the driving circuit 133 (in a time period from a time I to a time II shown in FIGS. 4A to 4C), the piezoelectric element 102 rapidly expands and is displaced toward the left (to the spring 104 side). With the displacement of the piezoelectric element 102 toward the left, the oscillating plate 103 is also rapidly displaced toward the left.

If the voltage of the oscillating plate electrodes 111 and 112 formed on the oscillating plate 103 (see FIG. 4B) and the voltage of the moving body side electrode 121a of the moving body 121 (see FIG. 4C) have the same potential, no electrostatic attraction is produced between the oscillating plate electrodes 111 and 112, and the moving body side electrode 121a. Consequently, the moving body 121 remains stationary due to inertia.

When there is a steep fall in the voltage applied to the piezoelectric element 102 (in a time period from the time II to the time III shown in FIGS. 4A to 4C), the piezoelectric element 102 rapidly contracts. Due to the elastic force of the spring 104 that presses against the piezoelectric element 102 and the oscillating plate 103, the piezoelectric element 102 is rapidly displaced toward the right. With the displacement of the piezoelectric element 102 toward the right, the oscillating plate 103 is also rapidly displaced toward the right.

If electrostatic attraction is produced by creating a potential difference between the oscillating plate electrodes 111 and 112 of the oscillating plate 103, and the moving body side electrode 121a of the moving body 121, frictional forces between the oscillating plate electrodes 111 and 112 and the moving body side electrode 121a of the moving body 121 increase. Consequently, the moving body 121 is also displaced toward the right with the displacement of the oscillating plate 103.

The moving body 121 can be moved toward the right in relation to the oscillating plate 103 by repeating the above-explained operation.

FIGS. 5A to 5C depict graphs of a driving waveform by which the moving body 121 is caused to move to the left in FIG. 1, and a driving voltage applied to each of the piezoelectric element 102 in FIG. 5A, the oscillating plate electrodes 111 and 112 in FIG. 5B, and the moving body side electrode 121a in FIG. 5C.

When there is a steep fall in the driving voltage (see FIG. 5A) applied to the piezoelectric element 102 by the driving circuit 133 (in a time period from a time I to a time II shown in FIGS. 5A to 5C), the piezoelectric element 102 rapidly contracts and is displaced toward the right (in a direction away from the spring 104). With the displacement of the piezoelectric element 102 toward the right, due to the elastic force of the spring 104, the oscillating plate 103 is also rapidly displaced toward the right.

If the voltage of the oscillating plate electrodes 111 and 112 formed on the oscillating plate 103 (see FIG. 5B) and the voltage of the moving body side electrode 121a of the moving body 121 (see FIG. 5C) have the same potential, no electrostatic attraction is produced between the oscillating plate electrodes 111 and 112, and the moving body side electrode 121a. Consequently, the moving body 121 remains stationary due to inertia.

When there is a steep rise in the voltage applied to the piezoelectric element 102 (in a time period from the time II to the time III shown in FIGS. 5A to 5C), the piezoelectric element 102 rapidly expands and is rapidly displaced toward the left. With the displacement of the piezoelectric element 102 toward the left, the oscillating plate 103 is also rapidly displaced toward the left.

If electrostatic attraction is produced by creating the potential difference between the oscillating plate electrodes 111 and 112 of the oscillating plate 103, and the moving body side electrode 121a of the moving body 121, frictional forces between the oscillating plate electrodes 111 and 112, and the moving body side electrode 121a of the moving body 121 increase. Consequently, the moving body 121 is displaced toward the left with the displacement of the oscillating plate 103.

The moving body 121 can be moved toward the left in relation to the oscillating plate 103 by repeating the above-explained operation.

Figure 6A:
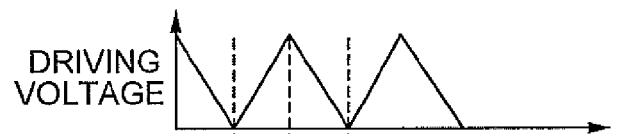
FIG. 6A depicts a graph of a driving waveform by which the moving body is caused to remain stationary on the oscillating plate electrode, and a driving voltage applied to the piezoelectric element.
Figure 6B:
FIG. 6B depicts a graph of a driving waveform by which the moving body is caused to remain stationary on the oscillating plate electrode, and a driving voltage applied to the oscillating plate electrode.
Figure 6C:
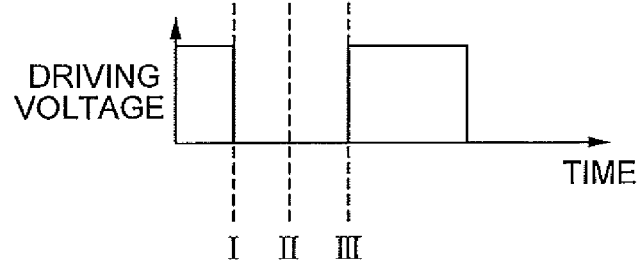
FIG. 6C depicts a graph of a driving waveform by which the moving body is caused to remain stationary on the oscillating plate electrode, and a driving voltage applied to the moving body side electrode.

FIGS. 6A to 6C depict graphs of a driving waveform by which the moving body 121 is caused to remain stationary at a fixed position on the oscillating plate electrodes 111 and 112, in other words, by which the moving body 121 is locked to the oscillating plate electrodes 111 and 112, and a driving voltage applied to the piezoelectric element 102 in FIG. 6A, the oscillating plate electrodes 111 and 112 in FIG. 6B, and the moving body side electrode 121a in FIG. 6C.

Electrostatic attraction is produced by constantly maintaining a potential difference between the oscillating plate electrodes 111 and 112 of the oscillating plate 103, and the moving body side electrode 121a of the moving body 121. Due to this, a certain frictional force is maintained between the oscillating plate electrodes 111 and 112, and the moving body side electrode 121a of the moving body 121. Although there is a displacement of the oscillating plate 103, the moving body 121 remains stationary at a fixed position on the oscillating plate 103. In other words, the moving body 121 is locked to the oscillating plate electrodes 111 and 112.

Figure 7:
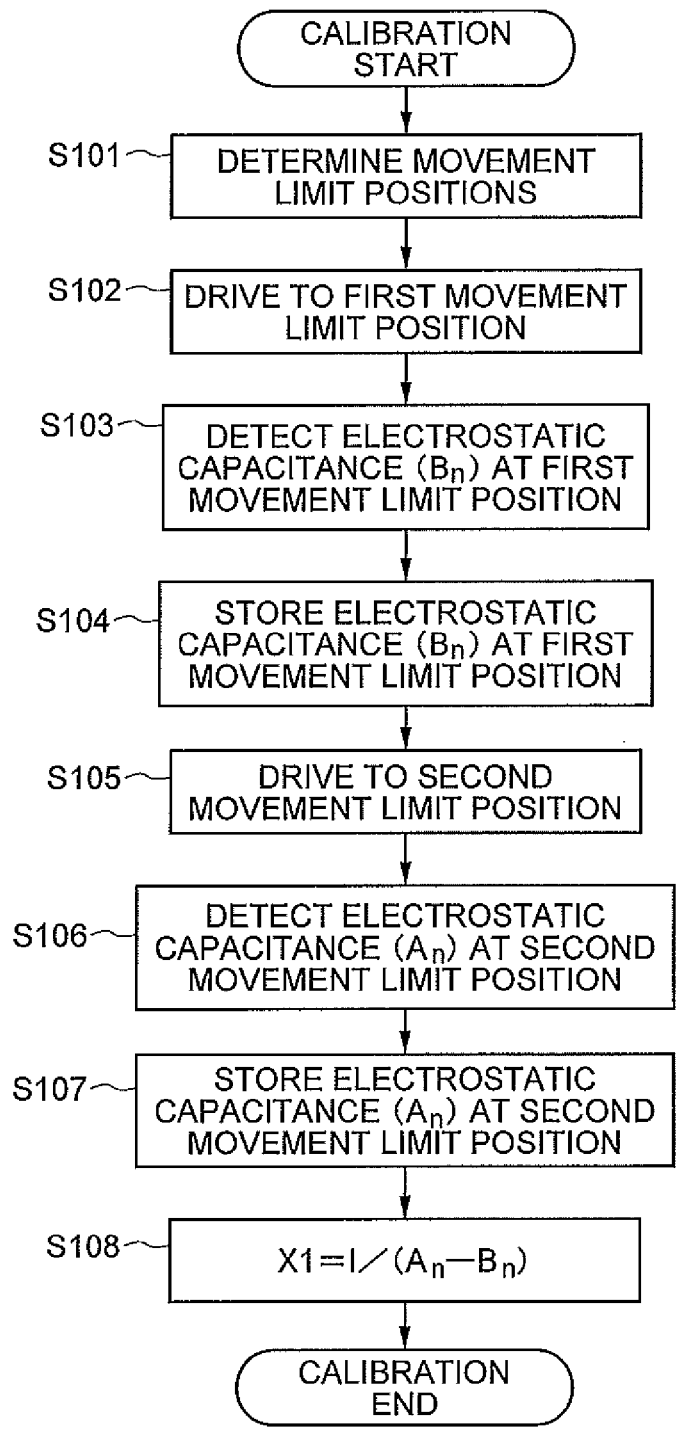
FIG. 7 is a flowchart of a calibration method for the inertial drive actuator according the first embodiment.

A calibration method is explained next with reference to FIG. 7. FIG. 7 is a flowchart of the calibration method of the inertial drive actuator 100 according to the first embodiment of the present invention.

In the following explanation, the moving body 121 is caused to move after the moving body 122 is locked to the oscillating plate electrodes 111 and 112. In other words, the moving body 121 is a target moving body for calculating an absolute position while the moving body 122 is a non-target moving body.

The calibration of the inertial drive actuator 100 is performed by first performing the process for the moving body 121 as the target moving body while the moving body 122 is locked, and then performing the process for the moving body 122 as the target moving body while the moving body 121 is locked. Any of these processes can be performed in the same sequence that is explained below.

In the calibration method explained in FIG. 7, the first movement limit position is the position where the moving body 121 abuts against the projection section 105 of the inertial drive actuator 100, and the second movement limit position is the position where the moving body 121 abuts against the moving body 122 that has been locked due to abutment with the projection section 106 of the inertial drive actuator 100.

The electrostatic capacitances between the moving body side electrode 121a of the moving body 121 and the oscillating plate electrodes 111 and 112 increase as the moving body 121 moves from the side of the projection section 105 toward the side of the projection section 106 (the moving body 122 side).

After the calibration starts, the driving voltages shown in FIGS. 4A to 4C are applied to the piezoelectric element 102, the oscillating plate electrodes 111 and 112, and the moving body side electrode 122a, and the moving body 122 is caused to move to the projection section 106. The moving body 122 is then locked to the oscillating plate electrodes 111 and 112 by applying the driving voltages shown in FIGS. 6A to 6C to the oscillating plate electrodes 111 and 112, and the moving body side electrode 122a, thus marking the movement limit position (the second movement limit position) of the moving body 121 (locking step, Step S101).

Subsequently, a voltage is applied to each of the oscillating plate electrodes 111 and 112, the moving body side electrode 121a, and the piezoelectric element 102, and the moving body 121 is caused to move to the first movement limit position (Step S102).

An electrostatic capacitance Bn at the first movement limit position is detected (electrostatic capacitance detection step, Step S103). The detected electrostatic capacitance Bn is stored in the electrostatic capacitance storage unit 132a (electrostatic capacitance storage step, Step S104).

Subsequently, a voltage is applied to each of the oscillating plate electrodes 111 and 112, the moving body side electrode 121a, and the piezoelectric element 102, and the moving body 121 is caused to move to the second movement limit position (Step S105). An electrostatic capacitance An at the second movement limit position is detected (electrostatic capacitance detection step, Step S106). The detected electrostatic capacitance An is stored in the electrostatic capacitance storage unit 132a (electrostatic capacitance storage step, Step S107).

The electrostatic capacitances An and Bn stored in the electrostatic capacitance storage unit 132a are substituted in Equation (I) given below to calculate a ratio X1 of a difference between the electrostatic capacitances at the first movement limit position and the second movement limit position, and a movement limit distance l between the first movement limit position and the second movement limit position (ratio calculation step, Step S108).

$$X1 = l/(An - Bn) \quad (I)$$

The ratio X1 represent a relation between the current electrostatic capacitances (that is, electrostatic capacitances when the calibration is being performed) and the movement limit distance (l) set at the time of assembly of the actuator. The calculated ratio X1 is stored in the ratio storage unit 132c, or in a central processing unit (CPU), after which the calibration ends. The distance l of the inertial drive actuator 100 can be a value set at the time of assembly of the actuator or can be regulated by the projection sections 105 and 106.

By using the ratio X1 calculated at the ratio calculation step as described above, the absolute position (current position) of the moving body 121 between the first movement limit position and the second movement limit position can be calculated by using Equation (II) given below.

$$\text{absolute position} = \text{electrostatic capacitance at the current position of the moving body } 121 \times X1 \quad (II)$$

Next, Steps S101 to S108 shown in FIG. 7 are performed by taking the moving body 122 as the target moving body and locking the moving body 121. Thus, the absolute position (current position) of the moving body 121 between the first movement limit position and the second movement limit position can be calculated.

(Second Embodiment)

Figure 8:
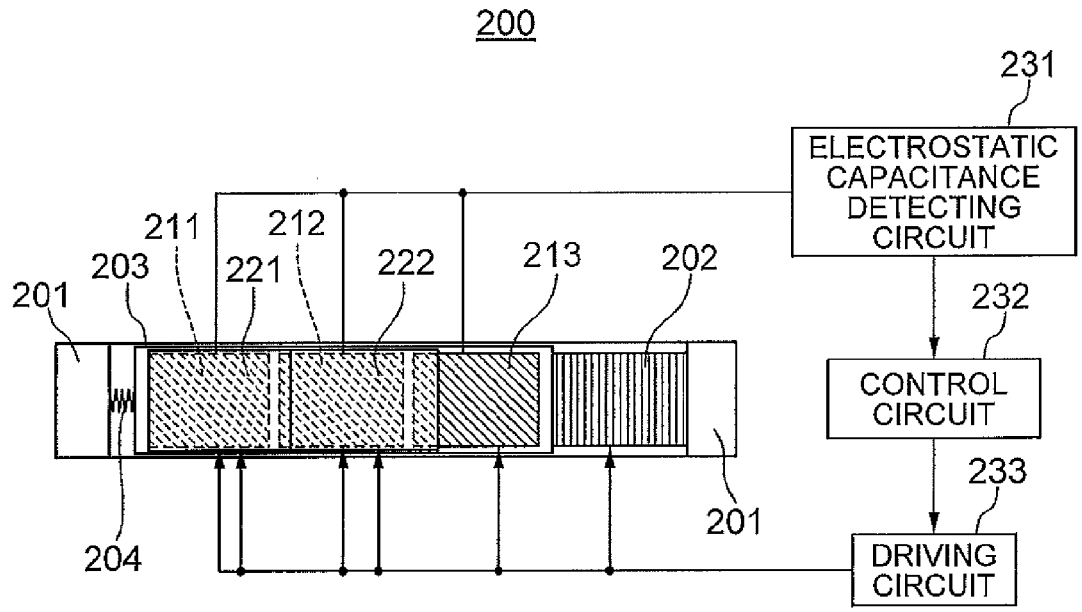
FIG. 8 is a plan-view depicting the structure of an inertial drive actuator device that includes an inertial drive actuator according to a second embodiment.
Figure 9:
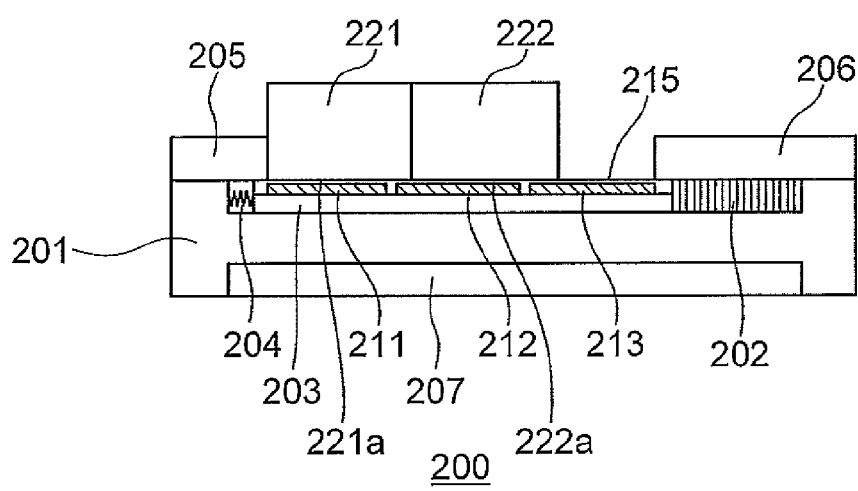
FIG. 9 is a side-view depicting the structure of the inertial drive actuator according to the second embodiment.

The structure of an inertial drive actuator 200 according to a second embodiment is explained with reference to FIGS. 8 and 9. FIG. 8 is a plan-view of the structure of an inertial drive actuator device that includes the inertial drive actuator 200 according to the second embodiment of the present invention. FIG. 9 is a side-view of the structure of the inertial drive actuator 200. Attention is drawn to the fact that projection sections 205 and 206 are not shown in FIG. 8.

The inertial drive actuator 200 according to the second embodiment differs from the inertial drive actuator 100 according to the first embodiment in that it includes three oscillating plate electrodes 211, 212, and 213 each having identical rectangular shape. The oscillating plate electrodes 211, 212, and 213 are sequentially arranged in a longitudinal direction of an oscillating plate 203. The rest of the structure of the inertial drive actuator 200 is identical to that of the inertial drive actuator 100 according to the first embodiment.

The oscillating plate electrodes 211, 212, and 213 should preferably be configured in such a way that the electrostatic capacitances between moving body side electrodes 221a and 222a and the oscillating plate electrodes 211, 212, and 213 vary, for example, increase, as moving bodies 221 and 222 move from one movement limiting position to the other movement limiting position. Furthermore, the positions of the moving bodies and the electrostatic capacitances should preferably have a proportional relationship in the movement range from one movement limiting position to the other movement limiting position. To achieve this, a slant can be given to the thickness of the oscillating plate electrodes 211, 212, and 213 so that the distance between each of the moving bodies 221 and 222 and each of the oscillating plate electrodes 211, 212, and 213 reduces as the moving bodies 221 and 222 move from one movement limiting position to the other movement limiting position.

A fixed member 201, a piezoelectric element 202, a spring 204, the projection sections 205 and 206, a permanent magnet 207, and the moving bodies 221 and 222 of the inertial drive actuator 200 are identical, respectively, to the fixed member 101, the piezoelectric element 102, the spring 104, the projection sections 105 and 106, the permanent magnet 107, and the moving bodies 121 and 122 of the inertial drive actuator 100 according to the first embodiment, and hence the explanation thereof is omitted.

The oscillating plate electrodes 211, 212, and 213 are formed on the upper surface of the oscillating plate 203. An insulation layer 215 is formed on the upper surface of the oscillating plate electrodes 211, 212, and 213. The moving bodies 221 and 222 are mounted on the oscillating plate electrodes 211, 212, and 213 with the insulation layer 215 disposed therebetween. The moving body side electrodes 221a and 222a are respectively formed on the lower surface of the moving bodies 221 and 222, that is, on the surface that is in contact with the oscillating plate electrodes 211, 212, and 213. With the displacement of the oscillating plate 203, the moving bodies 221 and 222 are capable of moving slidingly in relation to the insulation layer 215 in a longitudinal direction (right and left directions in FIGS. 8 and 9) of the oscillating plate 203 having a rectangular shape. The moving bodies 221 and 222 should preferably be made of a magnetic material or a conductive material.

A driving circuit 233 is connected to each of the piezoelectric element 202, the oscillating plate electrodes 211, 212, and 213, and the moving body side electrodes 221a and 222a. The driving circuit 233 applies a driving voltage to drive the piezoelectric element 202, the oscillating plate electrodes 211, 212, and 213, and the moving body side electrodes 221a and 222a. Furthermore, an electrostatic capacitance detecting circuit 231 is connected to each of the oscillating plate electrodes 211, 212. The electrostatic capacitance detecting circuit 231 detects electrostatic capacitances between the moving body side electrodes 221a and 222a, and the oscillating plate electrodes 211, 212, and 213. Signals output from the electrostatic capacitance detecting circuit 231 are input into a control circuit 232.

The structure of the control circuit 232 is identical to that of the control circuit 132 of the inertial drive actuator 100, and hence the explanation thereof is omitted. The inertial drive actuator device according to the second embodiment includes the inertial drive actuator 200, the electrostatic capacitance detecting circuit 231 and the driving circuit 233 that are connected to the inertial drive actuator 200, and the control circuit 232.

By virtue of the above-described structure, a calibration identical to that of the inertial drive actuator 100 can be executed even in the inertial drive actuator 200, and consequently, even if the electrostatic capacitances between the moving bodies 221 and 222, and the oscillating plate electrodes 211, 212, and 213 differ at a later stage after the assembly of the actuator, they can be corrected to appropriate values. As a result, absolute positions of the moving bodies 221 and 222 can be reliably and accurately calculated.

(Third Embodiment)

Figure 10:
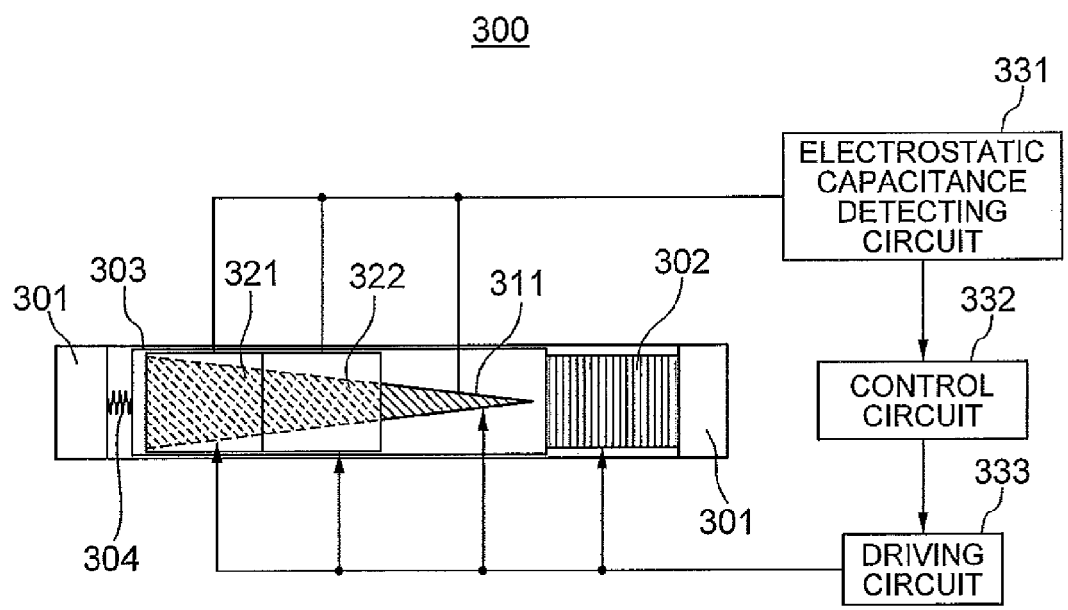
FIG. 10 is a plan-view depicting the structure of an inertial drive actuator device that includes an inertial drive actuator according to a third embodiment.
Figure 11:
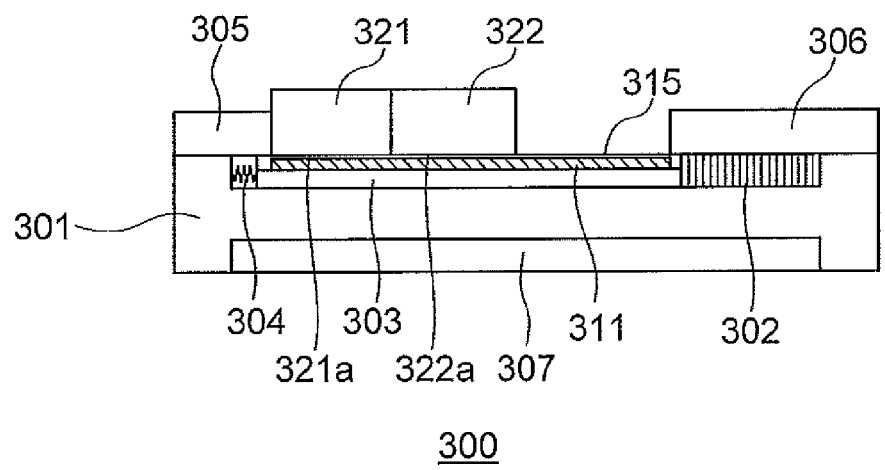
FIG. 11 is a side-view depicting the structure of the inertial drive actuator according to the third embodiment.

The structure of an inertial drive actuator 300 according to a third embodiment is explained with reference to FIGS. 10 and 11. FIG. 10 is a plan-view depicting the structure of an inertial drive actuator device that includes the inertial drive actuator 300 according to the third embodiment of the present invention. FIG. 11 is a side-view depicting the structure of the inertial drive actuator 300. Attention is drawn to the fact that projecting sections 305 and 306 are not shown in FIG. 10.

The inertial drive actuator 300 according to the third embodiment differs from the inertial drive actuator 100 according to the first embodiment in that it includes only one oscillating plate electrode 311. Moreover, a width of the oscillating plate electrode 311 narrows as one goes from a spring 304 toward a piezoelectric element 302 in a longitudinal direction of an oscillating plate 303. The rest of the structure of the inertial drive actuator 300 is identical to that of the inertial drive actuator 100 according to the first embodiment.

Because of the change in the width of the oscillating plate electrode 311 in the longitudinal direction of the oscillating plate 303, as moving bodies 321 and 322 move from one movement limit position to the other movement limit position, the electrostatic capacitances between moving body side electrodes 321a and 322a of the moving bodies 321 and 322 and the oscillating plate electrode 311 varies, for example, increase. Furthermore, as a planar shape of the oscillating plate electrode 311 is made into a triangular shape, there is a proportional relationship between the positions of the moving bodies 321 and 322 and the electrostatic capacitances in the movement range from one movement limit position to the other movement limit position.

A fixed member 301, the piezoelectric element 302, the spring 304, the projecting sections 305 and 306, a permanent magnet 307, and the moving bodies 321 and 322 of the inertial drive actuator 300 are identical, respectively, to the fixed member 101, the piezoelectric element 102, the spring 104, the projecting sections 105 and 106, the permanent magnet 107, and the moving bodies 121 and 122 of the inertial drive actuator 100 according to the first embodiment, and hence the explanation thereof is omitted.

The oscillating plate electrode 311 is formed on the upper surface of the oscillating plate 303. Moreover, an insulation layer 315 is formed on the upper surface of the oscillating plate electrode 311. The moving bodies 321 and 322 are mounted on the oscillating plate electrode 311, with the insulation layer 315 disposed therebetween. A moving body side electrode 321a is formed on the lower surface of the moving body 321, that is, on the surface that is in contact with the oscillating plate electrode 311 and a moving body side electrode 322a is formed on the lower surface of the moving body 322, that is, on the surface that is in contact with the oscillating plate electrode 311. With the displacement of the oscillating plate 303, the moving bodies 321 and 322 are capable of moving slidingly in relation to the insulation layer 315 in a longitudinal direction (right and left directions in FIGS. 10 and 11) of the oscillating plate 303 having a rectangular shape. The moving bodies 321 and 322 should preferably be made of a magnetic material or a conductive material.

A driving circuit 333 is connected to each of the piezoelectric element 302, the oscillating plate electrode 311, and the moving body side electrodes 321a and 322a of the moving bodies 321 and 322. The driving circuit 333 applies a driving voltage to drive each of the piezoelectric element 302, the oscillating plate electrode 311, and the moving body side electrodes 321a and 322a. Furthermore, an electrostatic capacitance detecting circuit 331 is connected to the oscillating plate electrode 311. The electrostatic capacitance detecting circuit 331 detects electrostatic capacitances between the moving body side electrodes 321a and 322a of the moving bodies 321 and 322 and the oscillating plate electrode 311. Signals output from the electrostatic capacitance detecting circuit 331 are input into a control circuit 332.

The structure of the control circuit 332 is identical to the control circuit 132 of the inertial drive actuator 100, and hence the explanation thereof is omitted. The inertial drive actuator device according to the second embodiment includes the inertial drive actuator 300, the electrostatic capacitance detecting circuit 331 and the driving circuit 333 that are connected to the inertial drive actuator 300, and the control circuit 332.

By virtue of the above-described structure, a calibration identical to that of the inertial drive actuator 100 can be executed even in the inertial drive actuator 300, and consequently, even if the electrostatic capacitances between the moving bodies 321 and 322 and the oscillating plate electrode 311 differ at a later stage after the assembly of the actuator, they can be corrected to an appropriate value. As a result, the absolute positions of the moving bodies 321 and 322 can be reliably and accurately calculated.

(Fourth Embodiment)

Figure 12:
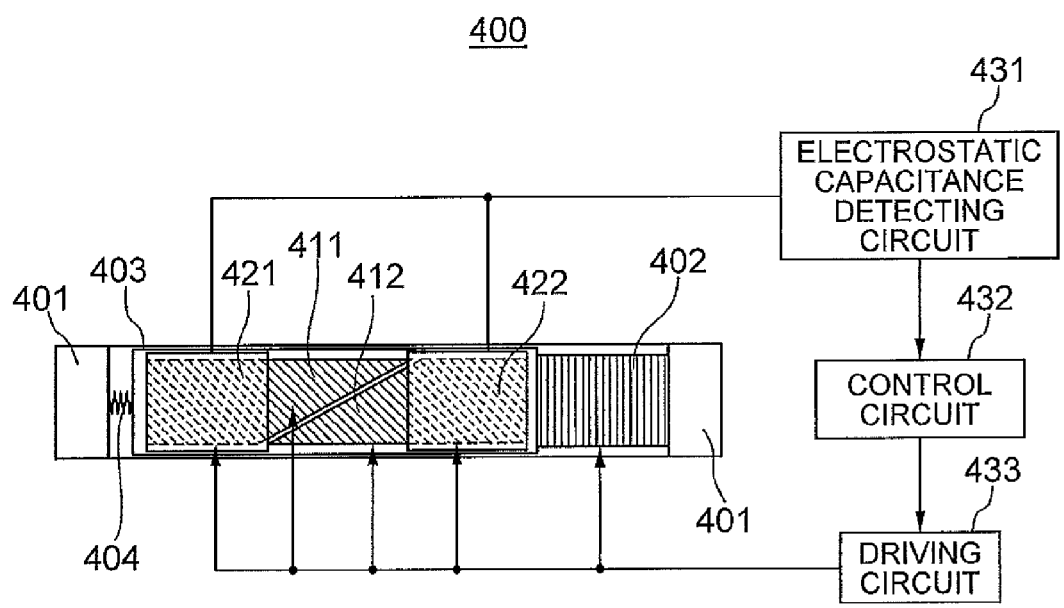
FIG. 12 is a plan-view depicting the structure of an inertial drive actuator device that includes an inertial drive actuator according to a fourth embodiment.
Figure 13:
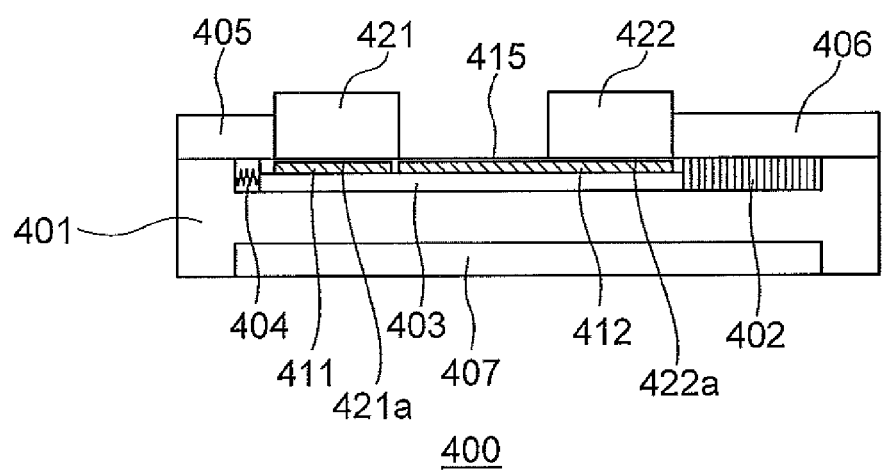
FIG. 13 is a side-view depicting the structure of the inertial drive actuator according to the fourth embodiment.

The structure of an inertial drive actuator 400 according to a fourth embodiment is explained with reference to FIGS. 12 and 13. FIG. 12 is a plan-view depicting the structure of an inertial drive actuator device that includes the inertial drive actuator 400 according to the fourth embodiment of the present invention. FIG. 13 is a side-view depicting the structure of the inertial drive actuator 400. Attention is drawn to the fact that projecting sections 405 and 406 are not shown in FIG. 12.

The inertial drive actuator 400 according to the fourth embodiment differs from the inertial drive actuator 100 according to the first embodiment in that it includes two oscillating plate electrodes 411 and 412 of trapezoidal shape and disposed in such a way that the oblique sides thereof are adjacent to each other. In other words, a width of the oscillating plate electrode 411 facing toward the oscillating plate electrode 412 narrows as one goes from a spring 404 toward a piezoelectric element 402, and a width of the oscillating plate electrode 412 facing toward the oscillating plate electrode 411 narrows as one goes from the piezoelectric element 402 to the spring 404. The rest of the structure of the inertial drive actuator 400 is identical to that of the inertial drive actuator 100 according to the first embodiment.

The oscillating plate electrodes 411 and 412 should preferably be configured in such a way that the electrostatic capacitance between moving body side electrodes 421a and 422a of moving bodies 421 and 422, and the oscillating plate electrodes 411 and 412 varies, for example, increases, as the moving bodies 421 and 422 move from one movement limiting position to the other movement limiting position. Furthermore, the positions of the moving bodies and the electrostatic capacitances should preferably have a proportional relationship in the movement range from one movement limiting position to the other movement limiting position. To achieve this, a slant can be given to the thickness of the oscillating plate electrodes 411 and 412 so that the distance between the moving body 421 and each of the oscillating plate electrodes 411 and 412 reduces as the moving body 421 moves from one movement limiting position to the other movement limiting position.

A fixed member 401, the piezoelectric element 402, the spring 404, the projecting sections 405 and 406, a permanent magnet 407, and the moving bodies 421 and 422 of the inertial drive actuator 400 are identical, respectively, to the fixed member 101, the piezoelectric element 102, the spring 104, the projecting sections 105 and 106, the permanent magnet 107, and the moving bodies 121 and 122 of the inertial drive actuator 100 according to the first embodiment, and hence the explanation thereof is omitted.

The oscillating plate electrodes 411 and 412 are formed on the upper surface of the oscillating plate 403. Moreover, an insulation layer 415 is formed on the upper surface of the oscillating plate electrodes 411 and 412. The moving bodies 421 and 422 are mounted on the oscillating plate electrodes 411 and 412, with the insulation layer 415 disposed therebetween. A moving body side electrode 421a is formed on the lower surface of the moving body 421, that is, on the surface that is in contact with the oscillating plate electrodes 411 and 412, and a moving body side electrode 422a is formed on the lower surface of the moving body 422, that is, on the surface that is in contact with the oscillating plate electrodes 411 and 412.

With the displacement of the oscillating plate 403, the moving bodies 421 and 422 are capable of moving slidingly in relation to the insulation layer 415 in a longitudinal direction (right and left directions in FIGS. 12 and 13) of the oscillating plate 403 having a rectangular shape. The moving bodies 421 and 422 should preferably be made of a magnetic material or a conductive material.

A driving circuit 433 is connected to each of the piezoelectric element 402, the oscillating plate electrodes 411 and 412, and the moving body side electrodes 421a and 422a of the moving bodies 421 and 422. The driving circuit 433 applies a driving voltage to drive each of the piezoelectric element 402, the oscillating plate electrodes 411 and 412, and the moving body side electrodes 421a and 422a. Furthermore, an electrostatic capacitance detecting circuit 431 is connected to each of the oscillating plate electrodes 411 and 412. The electrostatic capacitance detecting circuit 431 detects electrostatic capacitances between the moving body side electrode electrodes 421a and 422a of the moving bodies 421 and 422 and each of the oscillating plate electrodes 411 and 412.

Signals output from the electrostatic capacitance detecting circuit 431 are input into the control circuit 432. The structure of the control circuit 432 is identical to that of the control circuit 132 of the inertial drive actuator 100, and hence the explanation thereof is omitted. The inertial drive actuator device includes the inertial drive actuator 400, the electrostatic capacitance detecting circuit 431 and the driving circuit 433 that are connected to the inertial drive actuator 400, and the control circuit 432.

The electrostatic capacitance detecting circuit 431 detects the electrostatic capacitances between the oscillating plate electrode 411 and the moving body side electrode 421a and 422a as well as the electrostatic capacitances between the oscillating plate electrode 412 and the moving body side electrodes 421a and 422a. These electrostatic capacitances vary as the moving bodies 421 and 422 move from one movement limit position to the other movement limit position. The electrostatic capacitances between the moving body side electrode 421a and 422a and either of the oscillating plate electrodes 411 and 312 can be used for detecting the positions of the moving bodies 421 and 422.

By virtue of the above-described structure, a calibration identical to that of the inertial drive actuator 100 can be executed even in the inertial drive actuator 400, and consequently, even if the electrostatic capacitances between the moving bodies 421 and 422 and the oscillating plate electrodes 311 and 312 differ at a later stage after the assembly of the actuator, they can be corrected to appropriate values. As a result, the absolute position of the moving body 421 can be reliably and accurately calculated.

(Fifth Embodiment)

Figure 14:
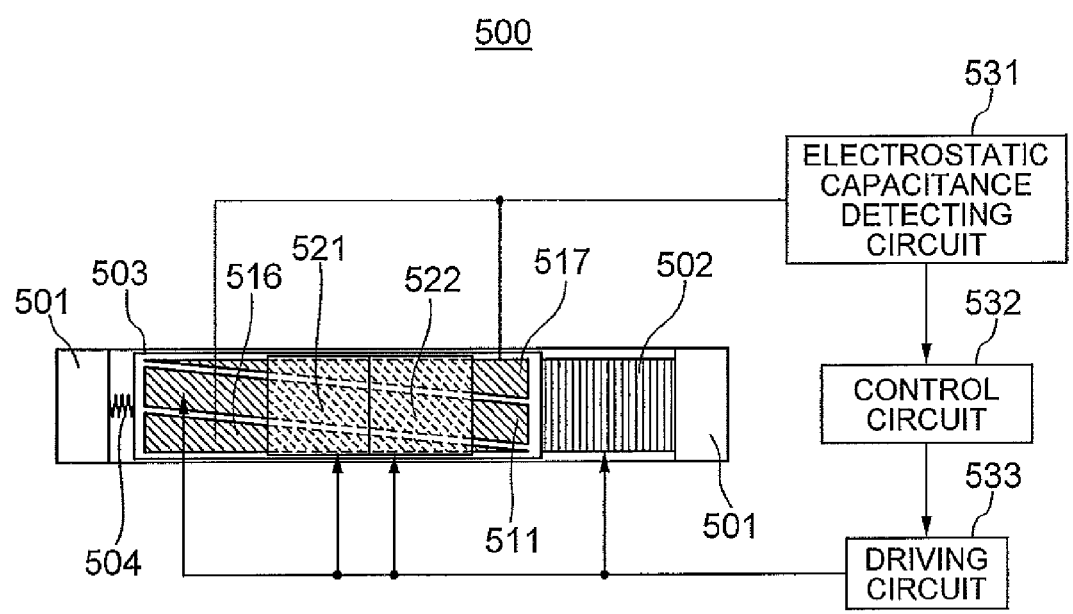
FIG. 14 is a plan-view depicting the structure of an inertial drive actuator device that includes an inertial drive actuator according to a fifth embodiment.
Figure 15:
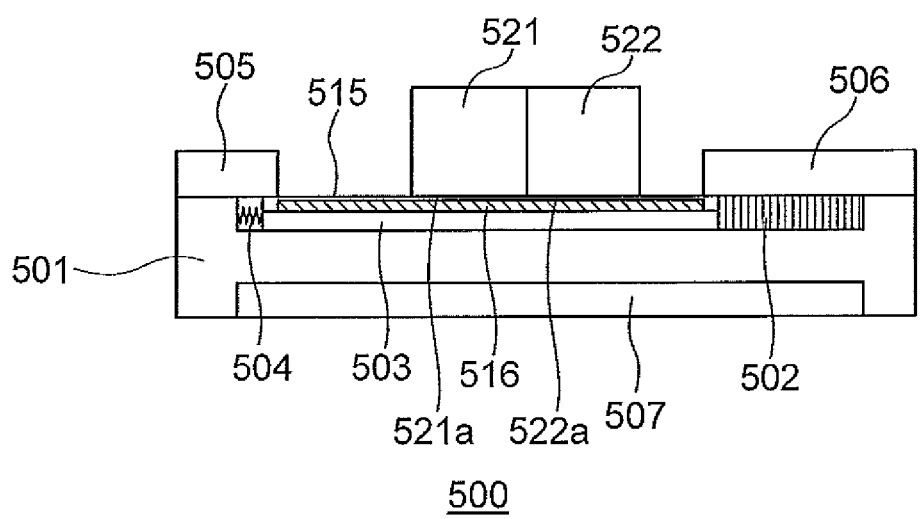
FIG. 15 is a side-view depicting the structure of the inertial drive actuator according to the fifth embodiment.

The structure of an inertial drive actuator 500 according to a fifth embodiment is explained with reference to FIGS. 14 and 15. FIG. 14 is a plan-view depicting the structure of an inertial drive actuator device that includes the inertial drive actuator 500 according to the fifth embodiment of the present invention. FIG. 15 is a side-view depicting the structure of the inertial drive actuator 500. Attention is drawn to the fact that projecting sections 505 and 506 are not shown in FIG. 14.

The inertial drive actuator 500 according to the fifth embodiment differs from the inertial drive actuator 100 according to the first embodiment in that it includes an oscillating plate 503 on which are formed two oscillating plate position detecting electrodes 516 and 517, with an oscillating plate driving electrode 511 disposed therebetween, instead of the oscillating plate electrodes 111 and 112. The rest of the structure of the inertial drive actuator 500 is identical to that of the inertial drive actuator 100 according to the first embodiment.

Specifically, the oscillating plate position detecting electrodes 516 and 517 have a planar shape of right-angled triangles and are disposed in such a way that the oblique sides thereof are adjacent to each other. Furthermore, the oscillating plate driving electrode 511 has a planar shape of a parallelogram whose long sides are arranged adjacent to the oblique sides of the oscillating plate position detecting electrodes 516 and 517.

Because the oscillating plate position detecting electrodes 516 and 517 have the planer shape described above, the electrostatic capacitances between the oscillating plate position detecting electrodes 516 and 517, and moving body side electrodes 521*a* and 522*a* of moving bodies 521 and 522 vary proportionally with the movement amounts as the moving bodies 521 and 522 move from one movement limit position to the other movement limit position.

A fixed member 501, a piezoelectric element 502, a spring 504, the projecting sections 505 and 506, a permanent magnet 507, and the moving bodies 521 and 522 of the inertial drive actuator 500 are identical, respectively, to the fixed member 101, the piezoelectric element 102, the spring 104, the projecting sections 105 and 106, the permanent magnet 107, and the moving bodies 121 and 122 of the inertial drive actuator 100 according to the first embodiment, and hence the explanation thereof is omitted.

The oscillating plate driving electrode 511, and the oscillating plate position detecting electrodes 516 and 517 are formed on the upper surface of the oscillating plate 503, and an insulation layer 515 is formed on the upper surface of the oscillating plate driving electrode 511. The moving bodies 521 and 522 are mounted on the oscillating plate driving electrode 511, and the oscillating plate position detecting electrodes 516 and 517 with the insulation layer 515 disposed therebetween. The moving body side electrode 521*a* is formed on the lower surface of the moving body 521, that is, on the surface that is in contact with the oscillating plate driving electrode 511, and the oscillating plate position detecting electrodes 516 and 517, and the moving body side electrode 522*a* is formed on the lower surface of the moving body 522, that is, on the surface that is in contact with the oscillating plate driving electrode 511, and the oscillating plate position detecting electrodes 516 and 517. With the displacement of the oscillating plate 503, the moving bodies 521 and 522 are capable of moving slidingly in relation to the insulation layer 515 in a longitudinal direction (left and right directions in FIGS. 14 and 15) of the oscillating plate 503 having a rectangular shape. The moving bodies 521 and 522 should preferably be made of a magnetic material or a conductive material.

A driving circuit 533 is connected to each of the piezoelectric element 502, the oscillating plate driving electrode 511, and the moving body side electrodes 521*a* and 522*a* of the moving bodies 521 and 522 and applies the driving voltage to drive the piezoelectric element 502, the oscillating plate driving electrode 511, and the moving body side electrodes 521*a* and 522*a*. Furthermore, an electrostatic capacitance detecting circuit 531 is connected to each of the oscillating plate position detecting electrodes 516 and 517. The electrostatic capacitance detecting circuit 531 detects the electrostatic capacitances between the moving body side electrodes 521*a* and 522*a* of the moving bodies 521 and 522 and the oscillating plate position detecting electrodes 516 and 517.

Signals output from the electrostatic capacitance detecting circuit 531 are input into the control circuit 532. The structure of the control circuit 532 is identical to that of the control circuit 132 of the inertial drive actuator 100, and hence the explanation thereof is omitted. The inertial drive actuator device includes the inertial drive actuator 500, the electrostatic capacitance detecting circuit 531 and the driving circuit 533 that are connected to the inertial drive actuator 500, and the control circuit 532.

The electrostatic capacitance detecting circuit 531 detects the electrostatic capacitances between the oscillating plate position detecting electrode 516 and the moving body side electrodes 521*a* and 522*a* as well as the electrostatic capacitances between the oscillating plate position detecting electrode 517 and the moving body side electrodes 521*a* and 522*a*. These electrostatic capacitances vary as the moving bodies 521 and 522 move from one movement limit position to the other movement limit position. The electrostatic capacitances between the moving body side electrodes 521*a* and 522*a* and either of the oscillating plate position detecting electrodes 516 and 517 can be used for detecting the positions of the moving bodies 521 and 522.

By virtue of the above-described structure, a calibration identical to that of the inertial drive actuator 100 can be executed even in the inertial drive actuator 500, and consequently, even if the electrostatic capacitances between the moving bodies 521 and 522 and the oscillating plate position detecting electrodes 516 and 517 differs at a later stage after the assembly of the actuator, they can be corrected to appropriate values. As a result, the absolute position of the moving bodies 521 and 522 can be reliably and accurately calculated.

(Sixth Embodiment)

Figure 16:
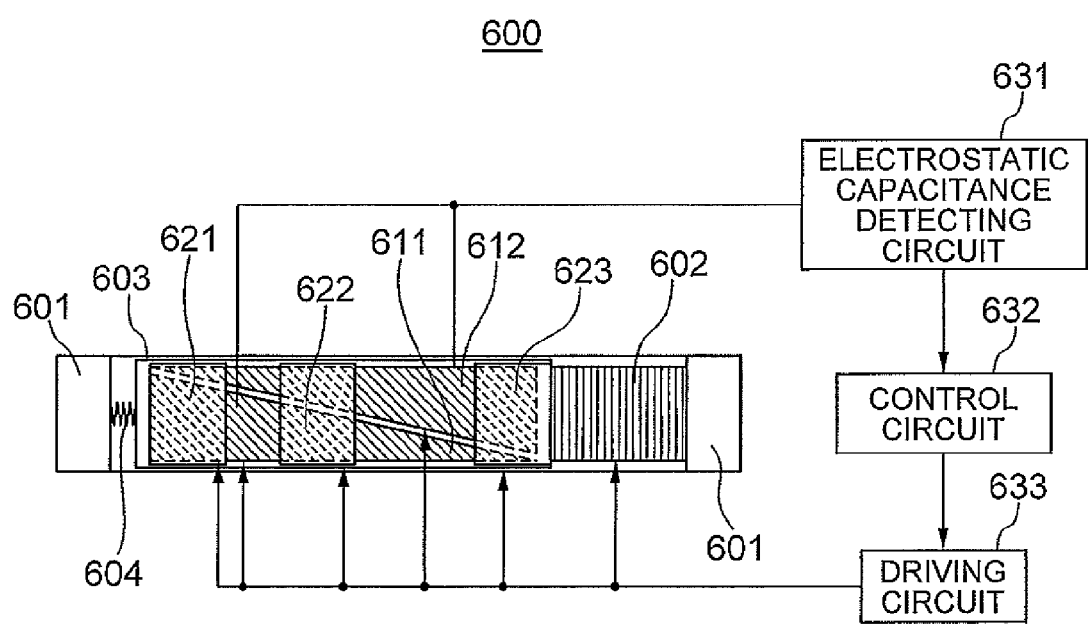
FIG. 16 is a plan-view depicting the structure of an inertial drive actuator device that includes an inertial drive actuator according to a sixth embodiment.
Figure 17:
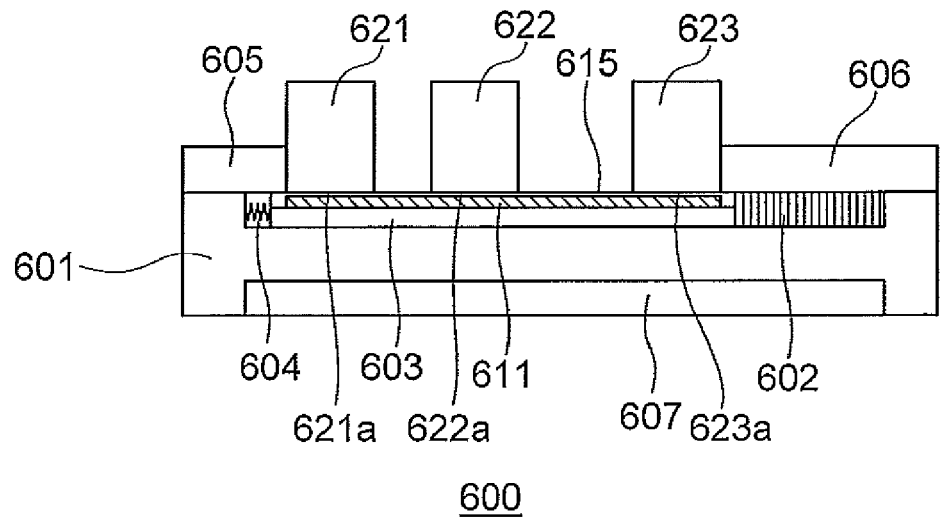
FIG. 17 is a side-view depicting the structure of the inertial drive actuator according to the sixth embodiment.

The structure of an inertial drive actuator 600 according to a sixth embodiment is explained with reference to FIGS. 16 and 17. FIG. 16 is a plan-view depicting the structure of an inertial drive actuator device that includes the inertial drive actuator 600 according to the sixth embodiment of the present invention. FIG. 17 is a side-view depicting the structure of the inertial drive actuator 600. Attention is drawn to the fact that projecting sections 605 and 606 are not shown in FIG. 16.

The inertial drive actuator 600 according to the sixth embodiment differs from the inertial drive actuator 100 according to the first embodiment in that it includes moving bodies 621, 622, and 623. The rest of the structure of the inertial drive actuator 600 is identical to that of the inertial drive actuator 100 according to the first embodiment.

The moving bodies 621, 622, and 623 are mounted on oscillating plate electrodes 611 and 612, with an insulation layer 615 disposed therebetween. Moreover, moving body side electrodes 621*a*, 622*a*, and 623*a* are respectively formed on the lower surface of the moving bodies 621, 622, and 623. With the displacement of an oscillating plate 603, the moving bodies 621, 622, and 623 are capable of moving slidingly in relation to the insulation layer 615 in a longitudinal direction (right and left direction in FIGS. 16 and 17) of the oscillating plate 603 having a rectangular shape. The moving bodies 621, 622, and 623 should preferably be made of a magnetic material or a conductive material.

Calibration of the inertial drive actuator 600 can be performed in a similar manner to that of the inertial drive actuator 100 by selecting one moving body as the target moving body while locking the other non-target moving bodies to the oscillating plate electrodes 611 and 612.

The calibration can also be performed simultaneously for a plurality of moving bodies (two or more moving bodies).

In performing calibration of a plurality of moving bodies simultaneously, all the moving bodies are first caused to move to the one movement limiting position. Subsequently, all the moving bodies are caused to move to the other movement limit position. The movement limiting position of each moving body is marked in the same manner as explained with reference to FIG. 7, that is, by the projection sections or by the other moving bodies sequentially butting against the projection section.

When the speed of all the moving bodies moving toward one movement limiting position and the other movement limiting position is the same, a movement amount per driving waveform can be simultaneously measured for the multiple moving bodies in the same manner as for two moving bodies explained with reference to FIG. 7.

On the other hand, when there is an incorrectly calibrated moving body, the positions of the moving bodies and the electrostatic capacitances are simultaneously associated and a calibration is performed, and the movement amount per driving waveform of each moving body is individually measured. When there is an incorrectly calibrated moving body, the incorrectly calibrated moving body is regarded as the target moving body and the rest of the moving bodies are locked, and the movement amount per driving waveform is measured separately.

Positions and electrostatic capacitances of moving bodies of multiple groups are simultaneously associated and the calibration is performed, and a movement amount per driving waveform is measured separately.

There is a low likelihood that all the moving bodies will have identical frictional state. Therefore, while no problem is encountered when moving the moving bodies to the movement limiting position and associating the position and the electrostatic capacitance, measuring the movement amount per driving waveform simultaneously would pose a problem because of the difference in the speed and the resulting collision of the moving bodies with each other. In such a case, all the moving bodies except the moving body for which the movement amount per driving waveform is to be measured should be moved completely in the direction opposite to that of the moving body for which the movement amount per driving waveform is to be measured. The clearing that results from this action serves as the movement limit distance of the moving body for which the movement amount per driving waveform is to be measured. The non-target moving body is immovably locked at a locking step. The movement amount per driving waveform is measured by the same method as for a single group.

(Seventh Embodiment)

Figure 18:
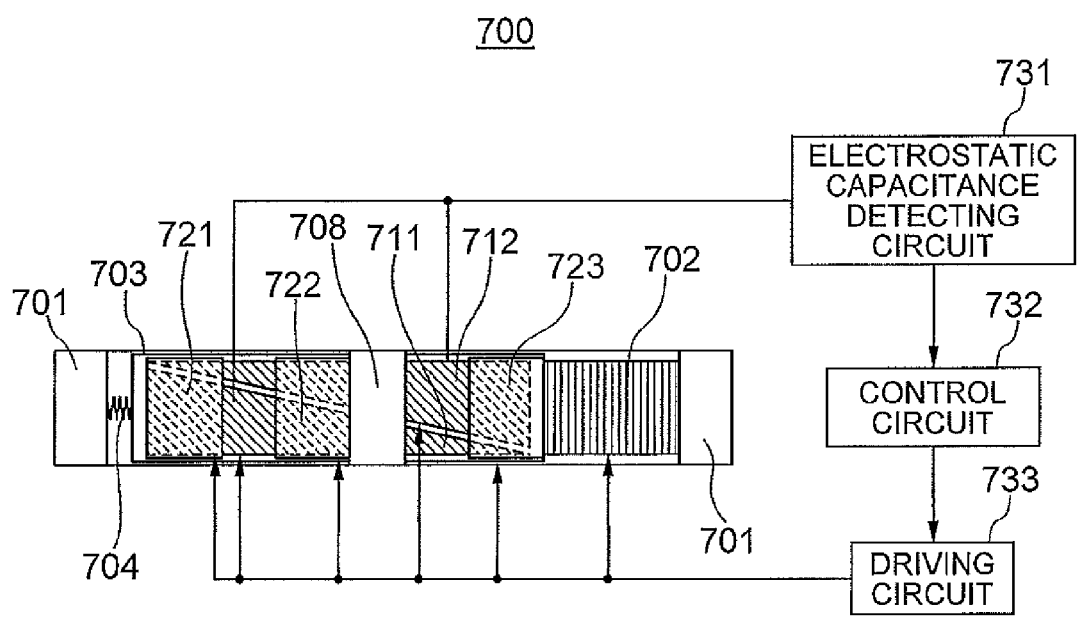
FIG. 18 is a plan-view depicting the structure of an inertial drive actuator device that includes an inertial drive actuator according to a seventh embodiment.
Figure 19:
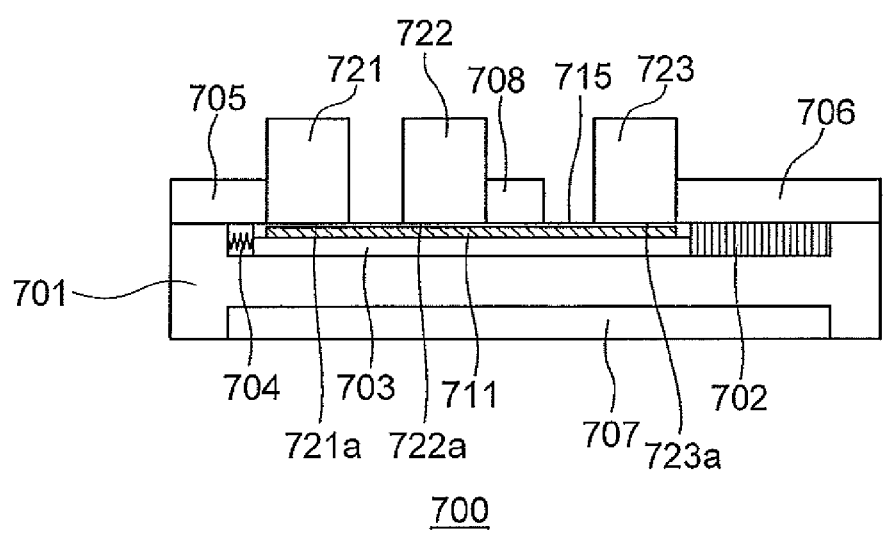
FIG. 19 is a side-view depicting the structure of the inertial drive actuator according to the seventh embodiment.
Figure 20:
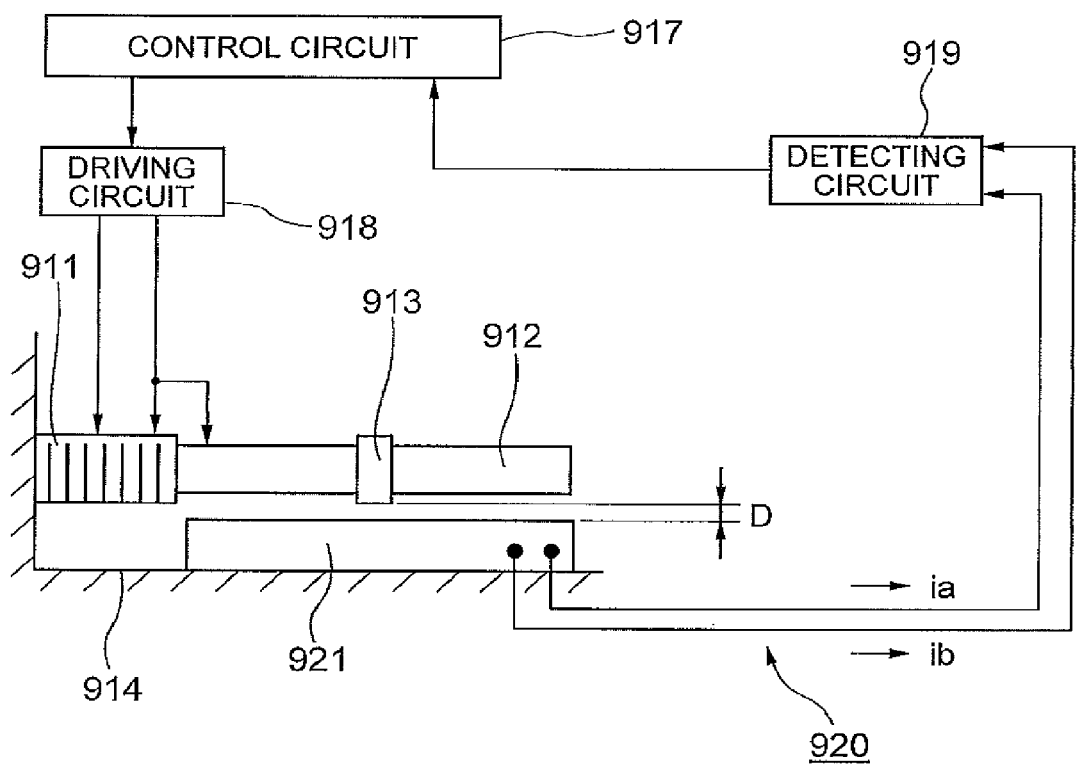
FIG. 20 is a side-view depicting the structure of a conventional actuator.
Figure 21:
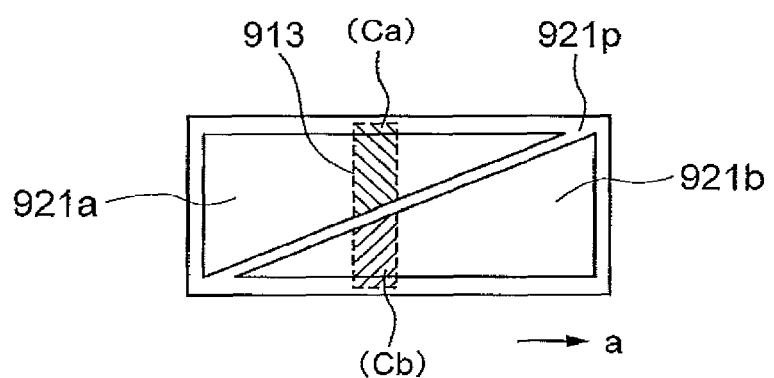
FIG. 21 is a plan-view depicting the structure of a detecting member and the relationship between the detecting member and a moving body.

The structure of an inertial drive actuator 700 according to a seventh embodiment is explained with reference to FIGS. 18 and 19. FIG. 18 is a plan-view depicting the structure of an inertial drive actuator device that includes the inertial drive actuator 700 according to the sixth embodiment of the present invention. FIG. 19 is a side-view depicting the structure of the inertial drive actuator 700. Attention is drawn to the fact that projecting sections 705 and 706 are not shown in FIG. 18.

The inertial drive actuator 700 according to the seventh embodiment differs from the inertial drive actuator 600 according to the sixth embodiment in that it includes a third projection section 708 that is provided between moving bodies 722 and 723 among three moving bodies 721, 722, and 723. The rest of the structure is identical to that of the inertial drive actuator 600 according to the sixth embodiment. In other words, a fixed member 701, a piezoelectric element 702, an oscillating plate 703, a spring 704, the projection sections 705 and 706, a permanent magnet 707, oscillating plate electrodes 711 and 712, the moving bodies 721, 722, and 723, an electrostatic capacitance detecting circuit 731, a control circuit 732, and a driving circuit 733 of the inertial drive actuator 700 according to the seventh embodiment are identical, respectively, to a fixed member 601, a piezoelectric element 602, the oscillating plate 603, a spring 604, the projection sections 605 and 606, a permanent magnet 607, the oscillating plate electrodes 611 and 612, the moving bodies 621, 622, and 623, an electrostatic capacitance detecting circuit 631, a control circuit 632, and a driving circuit 633 of the inertial drive actuator 600 according to the sixth embodiment, and hence the explanation thereof is omitted.

The projection section 708 is fixed to the oscillating plate 703 by adhesion or any other method. A configuration is allowable in which the projection section 708 is placed between the moving bodies 721 and 722.

By virtue of the above-described structure, calibration of the moving bodies 721 and 722 can be performed in the same manner as for the inertial drive actuator 100 according to the first embodiment. Further, for the calibration of the moving body 723, the position where the moving body 723 abuts against the projection section 708 can be regarded as the first movement limit position and the position where the moving body 723 abuts against the projection section 706 can be regarded as the second movement limit position.

An inertial drive actuator according to the present invention can be used in gadgets that require minute displacement of moving bodies.

When a plurality of moving bodies exist, an inertial-drive actuator calibration method and an inertial drive actuator device according to an embodiment of the present invention can perform a calibration accurately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A calibration method for inertial drive actuator of driving a target moving body among a plurality of moving bodies to move by inertia between a first movement limit position and a second movement limit position in relation to an oscillating plate that is moved to reciprocate by a moving member, and detecting positions of the moving bodies based on electrostatic capacitances, the calibration method comprising steps of:

detecting in which, electrostatic capacitances of opposing parts of a moving body side electrode provided in a target moving body and an oscillating plate electrode provided in the oscillating plate is detected at the first movement limit position and the second movement limit position, respectively;

storing in which, the electrostatic capacitances at the first movement limit position and the second movement limit position detected at the detecting step are stored; and calculating in which, a ratio of a difference between the electrostatic capacitances at the first movement limit position and the second movement limit position stored at the storing step to a movement limit distance that is a distance between the first movement limit position and the second movement limit position is calculated, wherein it is made possible to calculate an absolute position of the target moving body between the first movement limit position and the second movement limit position by using the ratio calculated at the calculating step, and at least one of the first movement limit position and the second movement limit position is a position where the target moving body abuts against a non-target moving body.

2. The calibration method for inertial drive actuator according to claim 1, wherein positions of the target moving bodies in a movement range from the first movement limit position to the second movement limit position, and the electrostatic capacitances have a proportional relationship.

3. The calibration method for inertial drive actuator according to claim 1, further comprising a step of comparing in which, the electrostatic capacitances stored at the storing step are compared.

4. The inertial-drive actuator calibration method according to claim 1, wherein there are a plurality of target moving bodies and a calibration thereof is mutually and simultaneously performed.

5. The inertial-drive actuator calibration method according to claim 1, further comprising a step of locking in which, the non-target moving body is locked to the oscillating plate.

6. The inertial-drive actuator calibration method according to claim 1, wherein a movement amount per driving waveform is simultaneously calculated for each of the moving bodies.

7. The inertial-drive actuator calibration method according to claim 1, wherein a movement amount per driving waveform is individually calculated for each of the moving bodies.

8. The calibration method for inertial drive actuator according to claim 1, wherein recalibration is induced when the electrostatic capacitance varies and an error is detected in a relationship between position data and the electrostatic capacitance even if the moving body is idle in absence of an input signal.

9. The calibration method for inertial drive actuator according to claim 1, wherein a movement amount per driving waveform when the target moving body is moved from the first movement limit position toward the second movement limit position and a movement amount per driving waveform when the target moving body is moved from the second movement limit position toward the first movement limit position is measured or calculated, and one of the movement amount per driving waveforms is stored or both the movement amount per driving waveforms are stored separately.

10. The calibration method for inertial drive actuator according to claim 9, wherein when calculating the movement amount per driving waveform, the target moving body is moved at least once near a center in a movement range from the first movement limit position to the second movement limit position.

11. The calibration method for inertial drive actuator according to claim 1, wherein the oscillating plate electrode is provided in a plurality, and the position of the target moving body is calculated by comparing or calculating electrostatic capacitances between the moving body side electrode and the respective oscillating plate electrodes.

12. The calibration method for inertial drive actuator according to claim 1, wherein the oscillating plate electrode includes any one of a driving electrode and a position detecting electrode or both.

13. The calibration method for inertial drive actuator according to claim 1, further comprising a step of confirming in which, a calibration result is confirmed.

14. The calibration method for inertial drive actuator according to claim 13, wherein recalibration is performed if it is confirmed at the confirming step that calibration is not performed correctly.

15. An inertial drive actuator device comprising:

an oscillating plate that is moved to reciprocate by a moving member;

a driving circuit that applies a drive signal to the moving member;

a plurality of moving bodies that move by inertia in relation to the oscillating plate, wherein a target moving body among the moving bodies moves by inertia between a first movement limit position and a second movement limit position, and at least one of the first movement limit position and the second movement limit position is a position where the target moving body abuts against a non-target moving body;

an electrostatic capacitance detecting circuit that detects an electrostatic capacitance of opposing parts of a moving body electrode provided in the moving bodies and an oscillating plate electrode provided in the oscillating plate;

an electrostatic capacitance storage unit that stores therein the electrostatic capacitance detected by the electrostatic capacitance detecting circuit;

a ratio calculating unit that calculates a ratio of the electrostatic capacitance stored in the electrostatic capacitance storage unit to a movement limit distance;

a ratio storage unit that stores therein the ratio calculated by the ratio calculating unit;

a current-position calculating unit that calculates current positions of the moving bodies based on the electrostatic capacitances detected by the electrostatic capacitance detecting circuit and the ratio stored in the ratio storage unit; and a drive-signal calculating unit that calculates drive signals with respect to the moving bodies based on differences between the current positions calculated by the current-position calculating unit and target positions.

16. The inertial drive actuator device according to claim 15, wherein the moving bodies include a conductive material.

17. The inertial drive actuator device according to claim 15, wherein a permanent magnet is disposed on a side of the oscillating plate facing the moving bodies, and the moving bodies include a magnetic material.

\* \* \* \* \*